(12) United States Patent
Fukunaga et al.

(10) Patent No.: US 6,464,054 B2
(45) Date of Patent: Oct. 15, 2002

(54) HYDRAULIC TORQUE TRANSMITTING DEVICE

(75) Inventors: Takao Fukunaga, Yahata (JP); Kozo Mori, Neyagawa (JP)

(73) Assignee: Exedy Corporation, Osaka (JP)

( * ) Notice: Subject to any disclaimer, the term of this patent is extended or adjusted under 35 U.S.C. 154(b) by 23 days.

(21) Appl. No.: 09/769,332

(22) Filed: Jan. 26, 2001

(65) Prior Publication Data

US 2001/0011489 A1 Aug. 9, 2001

(30) Foreign Application Priority Data

Feb. 4, 2000 (JP) ........................................ 2000-027468

(51) Int. Cl.$^7$ ........................... F16H 41/26; F16H 45/02
(52) U.S. Cl. .................................................. 192/3.29
(58) Field of Search .............................. 192/3.28, 3.29, 192/3.3; 60/361

(56) References Cited

U.S. PATENT DOCUMENTS

| | | | |
|---|---|---|---|
| 4,044,556 A | * 8/1977 | Kuramochi et al. | ....... 192/3.28 |
| 4,866,935 A | * 9/1989 | Hayabuchi et al. | ............ 60/361 |
| 5,918,713 A | * 7/1999 | Shimizu et al. | ............. 192/3.29 |
| 6,155,392 A | * 12/2000 | Kundermann | ................ 192/3.3 |
| 6,286,647 B1 | * 9/2001 | Matsuoka | ................... 192/3.29 |
| 6,289,674 B1 | * 9/2001 | Halene et al. | ................. 60/361 |

FOREIGN PATENT DOCUMENTS

| | | | |
|---|---|---|---|
| EP | 0 070 662 | * | 1/1983 |
| JP | 58-193966 A | * | 11/1983 |
| JP | 3-239850 A | * | 10/1991 |

* cited by examiner

Primary Examiner—Rodney H. Bonck
(74) Attorney, Agent, or Firm—Shinjyu Global IP Counselors, LLP

(57) ABSTRACT

A torque converter 1 equipped with a lockup device 8 is provided to secure sufficient space in the axial direction for the damper in a hydraulic torque transmitting device provided with a lockup device having a damper. Lockup device 8 is disposed between a front cover 4 and a turbine 6. Lockup device 8 has a clutch mechanism 31 for mechanically coupling front cover 4 and turbine 6 and a damper mechanism 32 for absorbing and attenuating torsional vibrations. In the vicinity of its outlet, turbine 6 has a linearly shaped part 62 that is aligned with damper mechanism 32. As a result, the axial dimensions of torsion springs 52 can be enlarged.

17 Claims, 1 Drawing Sheet

HYDRAULIC TORQUE TRANSMITTING DEVICE

BACKGROUND OF THE INVENTION

1. Field of the Invention

This invention generally relates to a hydraulic torque transmitting device for transmitting torque via a fluid. More specifically, the present invention relates to a device that includes a fluid coupling or a torque converter.

2. Background Information

A torque converter is one type of hydraulic torque transmitting device that transmits power by means of a fluid inside a torus. A torus comprises three types of bladed wheel: an impeller, a turbine, and a stator. Some torque converters have a lockup device provided in the space between the front cover and the torus. The lockup device serves to mechanically transmit the torque of the front cover to the transmission side and is provided with a clutch mechanism and a damper mechanism. The clutch mechanism is designed so that it couples with or releases from the front cover in accordance with changes in the hydraulic pressure within the torque converter. The damper mechanism contains, for example, a plurality of torsion springs. When the lockup device is engaged, the torsion springs serve to absorb and attenuate torsional vibrations caused by such factors as fluctuations in the torque input from the engine.

In recent years, torque transmission using the fluid is only conducted during acceleration from a state of rest and the lockup device is engaged when the speed of the vehicle exceeds, for example 10 km. Regarding this kind of structure, wherein the lockup region has been expanded to the low speed region, there is a demand for improving the performance of the torsion springs so that fluctuations in the torque from the engine can be sufficiently absorbed and attenuated. More specifically, in order to obtain torsion springs having low stiffness, it is preferable for the coil diameter of the torsion springs to exceed a prescribed value. Meanwhile, the space where the torque converter will be disposed is clearly restricted in the axial direction and all components of the torque converter must fit there within.

In view of the above, there exists a need for a hydraulic torque transmitting device which overcomes the above mentioned problems in the prior art. This invention addresses this need in the prior art as well as other needs, which will become apparent to those skilled in the art from this disclosure.

SUMMARY OF THE INVENTION

One object of the present invention is to secure sufficient space in the axial direction for the damper in a hydraulic torque transmitting device that is provided with a lockup device having a damper.

The foregoing object is basically attained by providing a hydraulic torque transmitting device of the present invention that uses a fluid to transmit torque and is equipped with a front cover, an impeller, a turbine, and a lockup device. Torque is input to the front cover. The impeller and the front cover form a fluid working chamber. The turbine is disposed within the fluid working chamber so as to face the impeller. The lockup device is disposed between the front cover and the turbine. The lockup device has a clutch part for mechanically coupling said front cover to said turbine and a damper part for attenuating torsional vibration. In the vicinity of its outlet, the turbine has a linearly shaped part corresponding to the damper part.

With this hydraulic torque transmitting device, the linearly shaped part formed on the turbine makes it possible to distance the turbine from the damper part further in the axial direction than is possible with the prior art. As a result, the dimension of the damper part in the axial direction can be made larger. The linearly shaped part mentioned here refers to a straight line or a shape having a curvature that is nearly linear.

The hydraulic torque transmitting device in accordance with another aspect of the present invention is basically the same as prior aspect of the present invention with the additional stipulation that the linearly shaped part include a tapered surface that faces said damper part.

The hydraulic torque transmitting device the prior aspect of the present invention is basically the same as the prior aspect of the present invention with the additional stipulation that the tapered surface be formed by the turbine shell of the turbine.

The hydraulic torque transmitting device the prior aspect of the present invention is basically the same as any one of the prior aspects of the present invention with the additional stipulation that the ratio (S/D) of the length S of the tapered surface in the radial direction to the outer radius D of the torus be in the range of about 0.09 to about 0.19. With this hydraulic torque transmitting device, the linearly shaped part is established within a prescribed range. If the linearly shaped part is smaller than this range, it will not be possible to make the damper part sufficiently large in the axial direction. If the linearly shaped part is larger than this range, the turbine performance will decline.

The hydraulic torque transmitting device the prior aspect of the present invention is basically the same as any one of the prior aspects of the present invention with the additional stipulation that the flow passage area of the outlet of the turbine be smaller than the flow passage area of the inlet of said turbine. With this hydraulic torque transmitting device, the turbine outlet does not need to be closer than necessary to the stator even though a linearly shaped part is provided. As a result, a sufficiently large dimension in the axial direction can be secured for the stator in a torque converter that has a stator.

The hydraulic torque transmitting device the prior aspect of the present invention is basically the same as the prior aspect of the present invention with the additional stipulation that the flow passage area of the outlet of the turbine be smaller than the flow passage area of the inlet of the turbine by 2 to 5% of the flow passage area of the inlet of the turbine. With this hydraulic torque transmitting device, the flow passage area of the outlet of the turbine is smaller than the flow passage area of the inlet of the turbine by an amount that falls within a prescribed range. If the amount is larger than this range, the turbine performance will decline. If the amount is smaller than this range, then it will not be possible to secure a sufficiently large dimension for the stator in the axial direction in a torque converter that has a stator.

The hydraulic torque transmitting device the prior aspect of the present invention is basically the same as either of the two prior aspects of the present invention with the additional stipulation that the flow passage area of the outlet of the turbine be larger than the flow passage area of the inlet of the stator. With this hydraulic toque transmitting device, even though the flow passage area of the outlet of the turbine is smaller than the flow passage area of the inlet, the hydraulic torque transmitting performance does not decline because the flow passage area of the outlet of the turbine is larger than the flow passage area of the stator.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
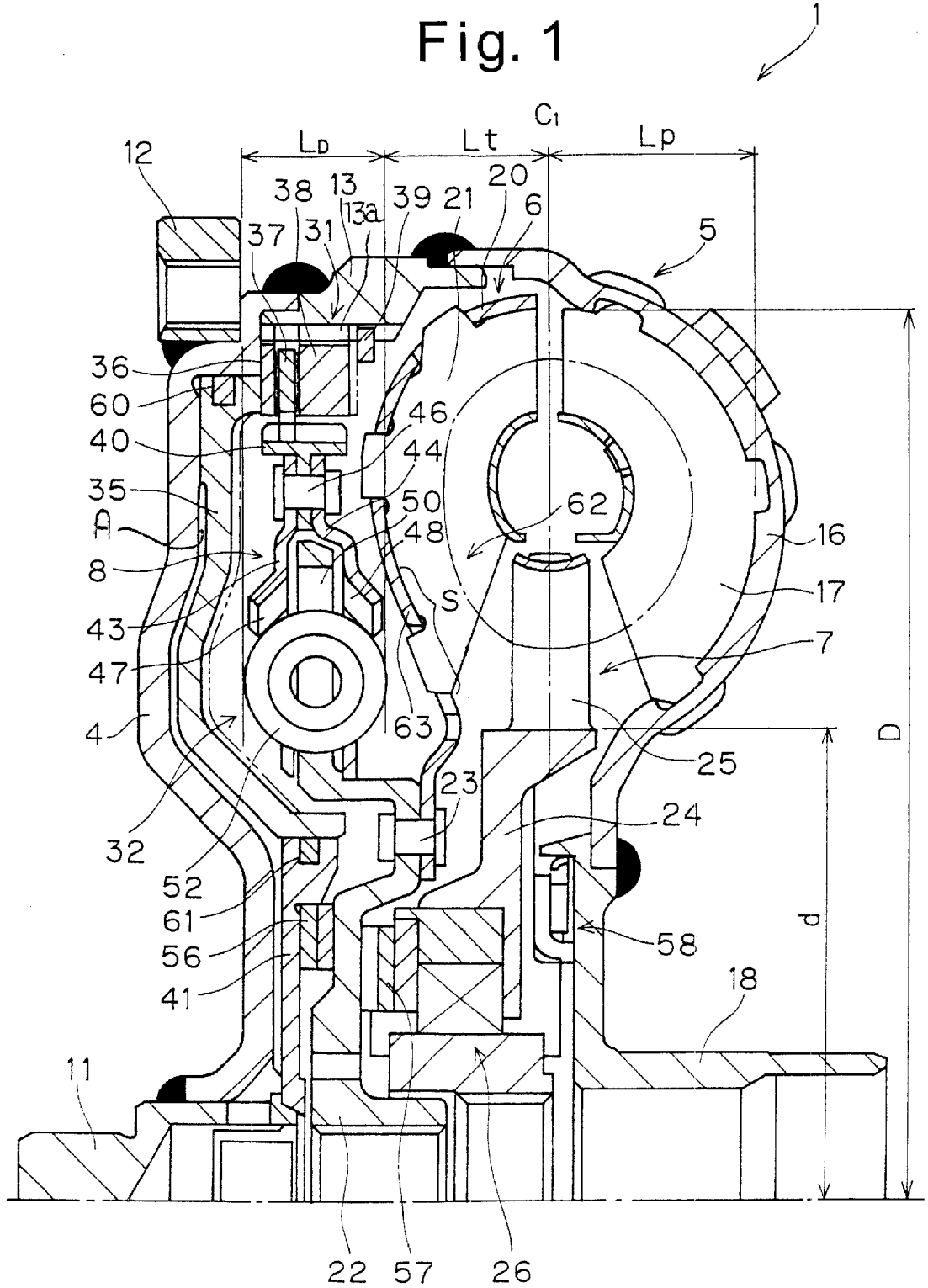
FIG. 1 is a vertical cross sectional schematic view of a torque converter in accordance with a first embodiment of the present invention.

FIG. 1 shows a vertical cross-sectional schematic of a torque converter 1 that uses an embodiment of the present invention. Torque converter 1 serves to transmit torque from the crankshaft (not shown) of an engine to a transmission input shaft (not shown). Torque converter 1 is particularly useful in motor vehicles. The engine (not shown) is disposed to the left side of torque converter 1 in FIG. 1, while the transmission (not shown) is disposed to the right side of torque converter 1 in FIG. 1. Line O—O in FIG. 1 is the rotational axis of torque converter 1.

Torque converter 1 basically comprises a torus-shaped main body, which is made up of three types of bladed wheels (impeller 5, turbine 6 and stator 7), and a lockup device 8.

Front cover 4 is a disk-shaped member that is positioned the closest to the engine side of the torque converter 1 in the axial direction. A center boss 11 is welded to the inner circumferential part of front cover 4. Center boss 11 is a rod-shaped member that extends in the axial direction. Center boss 11 is inserted through a center hole in the crankshaft (not shown). The outermost circumferential part of front cover 4 has a plurality of circumferentially spaced apart nuts 12 that are fixedly coupled thereto at equally spaced apart locations. A flexible plate (not shown) is preferably fixed to these nuts 12 by means of bolts.

An outer cylindrical member 13 is welded to the outer circumferential part of front cover 4 and extends in the axial direction toward the transmission side. The inner face of outer cylindrical member 13 has a plurality of teeth 13a that extend in the axial direction and that are lined circumferentially along the inner face of outer cylindrical member 13. Also, the outer edge of impeller shell 16 of impeller 5 is welded to the end of outer circumferential member 13 that faces the transmission side of the torque converter 1 in the axial direction. As a result, a fluid working chamber filled with working fluid is formed inside the torque converter 1 by front cover 4, outer cylindrical member 13, and impeller shell 16. Outer cylindrical member 13 can also be thought of as a part of front cover 4.

Impeller 5 basically comprises an impeller shell 16, a plurality of impeller blades 17 that are fixed to the inside of impeller shell 16, and an impeller hub 18 that is fixed to the inner circumferential part of impeller shell 16.

Turbine 6 is disposed opposite to the impeller blades 17 inside the fluid working chamber. Turbine 6 basically comprises a turbine shell 20 and a plurality of turbine blades 21 fixedly coupled to the surface of turbine shell 20 that faces the impeller blades 17. The inner circumferential part of turbine shell 20 is fixedly coupled to a radially intermediate section of turbine hub 22 by means of a plurality of rivets 23. The inner circumferential face of turbine hub 22 has a spline groove that mates with the transmission input shaft (not shown) in such a manner that relative rotation therebetween is not possible.

Stator 7 is a mechanism that serves to adjust the flow of the working fluid returning to impeller 5 from turbine 6. Stator 7 is single-piece member made of cast resin or cast aluminum alloy. Stator 7 is disposed axially between the inner circumferential part of impeller 5 and the inner circumferential part of turbine 6. Stator 7 basically comprises a ring-shaped carrier 24 and a plurality of stator blades 25 provided on the outer circumferential face of carrier 24. Carrier 24 is supported on a cylindrical shaft (not shown) with one-way clutch 26 disposed therebetween.

A disk-shaped member 41 is disposed axially between the inner circumferential part of front cover 4 and the inner circumferential part of turbine hub 22. Disk-shaped member 41 is fixedly coupled to the end of center boss 11 that faces toward the transmission side in the axial direction. In short, disk-shaped member 41 rotates integrally with front cover 4 and center boss 11. The outer edge of disk-shaped member 41 extends roughly to the vicinity of the plurality of rivets 23. Disk-shaped member 41 divides the space between the inner circumferential part of front cover 4 and the inner circumferential part of turbine hub 22 in the axial direction. Additionally, at least one washer 56 is disposed between disk-shaped member 41 and the inner circumferential part of turbine hub 22. Preferably, one of the washers 56 has a plurality of radial grooves that extend over the entire width of the washers 56 in the radial direction so that fluid can pass radially over the washer 56.

A washer 57 is disposed axially between the inner circumferential part of turbine 22 and one-way clutch 26. Washer 57 is formed of a radial plurality of grooves that extend over the entire width of the washer 57 in the radial direction so that fluid can pass radially over the washer 57. A thrust bearing 58 is disposed axially-between carrier 24 and impeller hub 18. Also, on the thrust bearing side of carrier 24 are formed a plurality of grooves that extend over the entire width of the carrier 24 in the radial direction to permit fluid to flow in a radial direction over carrier 24.

Next, the lockup device 8 will now be explained. Lockup device 8 mainly comprises a clutch mechanism 31, a damper mechanism 32 and a piston 35. Clutch mechanism 31 serves to make it possible to transmit torque directly from front cover 4 to turbine 6. Clutch 31 basically comprises an outer cylindrical member 13, an inner cylindrical member 40, a pair of clutch plates 36, 37 and 38, and a piston 35.

The outer edges of clutch plates 36 and 38 are provided with outer circumferential teeth that mate with the teeth 13a of outer cylindrical member 13. As a result, clutch plates 36 and 38 integrally rotate with front cover 4 and outer cylindrical member 13, but can also move relative these components in the axial direction.

Clutch plate 37 is disposed axially-between plate 36 and plate 38. The inner edge of clutch plate 37 is provided with a plurality of teeth that non-rotatably couples clutch plate 37 to inner cylindrical member 40, but allows for relative axial movement therebetween. Also, a frictional facing is applied to both axially oriented faces of plate 37.

The outer face of inner cylindrical member 40 is provided with a plurality of teeth that extend in the axial direction and are lined circumferentially around the outer face of inner cylindrical member 40. The teeth on the outer face of inner cylindrical member 40 mate with the teeth on the inner edge of plate 37. As a result, plate 37 rotates integrally with inner cylindrical member 40 and can move axially relative to the inner cylindrical member 40. Also, inner cylindrical member 40 has a flange that extends along its inner circumferential side for coupling clutch mechanism 31 to damper mechanism 32 as discussed below.

A snap ring 39 is attached to the transmission side of the inner circumferential edge of outer cylindrical member 13. Snap ring 39 serves to restrict axial movement of plates 36–38 and other parts in the axial direction toward the transmission.

Piston 35 is a roughly disk-shaped or ring-shaped member. Piston 35 is disposed close to the transmission side of front cover 4 in the axial direction. The outer circumferential face of piston 35 touches against the inner circumferential face of the outer circumferential side of front cover 4. Thus, piston 35 is supported in the radial direction by front cover 4. Piston 35 is capable of moving relative to front cover 4 in the axial and rotational directions.

A ring-shaped seal member 60 is attached to the outer circumferential face of piston 35. Seal member 60 touches against an inner circumferential surface of front cover 4 to block the flow of working fluid between the two axial sides of piston 35.

The inner circumferential surface of piston 35 contacts and is supported by the outer circumferential face of disk-shaped member 41. A ring-shaped seal member 61 is attached to the outer circumferential face of disk-shaped member 41. Seal member 61 touches against the inner circumferential face of piston 35 to block the flow of working fluid between the two axial sides of piston 35. Also, the outer circumferential section of piston 35 is disposed in proximity to clutch plate 36. Thus, piston 35 is structurally arranged to move in the axial direction in response to hydraulic pressure changes within the hydraulic chamber A formed between piston 35 and front cover 4. This hydraulic chamber A communicates with the oil passage of an input shaft (not shown) via the axial gap between the inner circumferential part of front cover 4 and the disk-shaped member 41 and also via a hole provided in center boss 11.

Damper mechanism 32 basically comprises a pair of drive plates 43 and 44, a turbine hub 22, and a plurality of torsion springs 52. Drive plates 43 and 44 are ring-shaped and disk-shaped members whose outer circumferential parts are fixedly coupled together. Consequently, the inner circumferential sections of drive plates 43 and 44 are separated by an interval in the axial direction to receive a portion of turbine hub 22 therebetween. The outer circumferential parts of drive plates 43 and 44 touch the two axially directed sides of the flange of inner cylindrical member 40, and are fixed by means of a plurality of rivets 46. Drive plates 43 and 44 have a plurality of spring supports 47 and 48, respectively, formed therein. Preferably, four pairs of spring supports 47 and 48, which are windows with flanges that are cut and bent upwardly to extend in the axial direction. Spring supports 47 and 48 are provided on the inner circumferential sections of drive plates 43 and 44.

The turbine hub 22 has an inner circumferential section with a splined bore, a middle circumferential section fixed to turbine 6, and an outer circumferential section elastically coupled in the circumferential direction with drive plates 43 and 44 via torsion springs 57.

The outer circumferential section of turbine hub 22 extends in the outward circumferential direction from its middle circumferential section where rivets 23 are attached to turbine 6. The outer circumferential section of turbine 22 is disposed axially between drive plates 43 and 44. Thus, the inner circumferential section of turbine hub 22 engages with the main drive shaft (not shown), while the outer circumferential section of the turbine hub 22 is a disk-shaped member as well as ring-shaped member that engages drive plates 43 and 44. Window holes 50 are provided in a part of the outer circumferential section of turbine hub 22 corresponding to spring supports 47 and 48.

Torsion springs 52 are members that are disposed inside window holes 50 and inside spring supports 47 and 48. These members serve to transmit torque from drive plates 43 and 44 to turbine hub 22 and to absorb and attenuate torsional vibrations. More specifically, torsion springs 52 are made of a coil springs extend in a circumferential direction and have an arc shape or a linear shape. Both circumferentially directed ends of torsion springs 52 are supported by window hole 50. Both circumferentially directed ends of springs 52 contact the circumferential ends of supports 47 and 48. Also, both axially directed sides of torsion springs 52 are supported by spring supports 47 and 48. As explained earlier, turbine hub 22 both transmits torque from turbine 6 and forms a portion of damper mechanism 32 of lockup device 8. Thus, having a single member performing a plurality of functions reduces the number of components.

Next the structure, positioning and dimensions of the members and mechanisms making up the torque converter 1 will now be discussed. The flow passage extending from the inlet to the outlet of turbine 6 has a plurality of curvatures. The flow passage in the vicinity of the outlet of turbine 6 includes a substantially linearly shaped part 62, which is linear or slightly curved with a curvature that is nearly linear. Linearly shaped part 62 is axially aligned with damper mechanism 32. More particularly, linearly-shaped part 62 is axially aligned with torsion springs 52 of lockup device 8. Even more particularly, linearly shaped part 62 is lined up with torsion springs 52 in the axial direction and is in close proximity to the same. In a cross section of turbine shell 20, linearly shaped part 62 has roughly linear tapered part 63. The outside surface of tapered part 63, i.e., the surface that faces toward damper mechanism 32, is also a tapered surface. The inclined angle of tapered part 63 (i.e., the angle formed between tapered part 63 and a plane perpendicular to the rotational axis O—O of torque converter 1) is approximately 20 degrees. It is preferred that the inclined angle be in the range of about 15 to about 25 degrees.

Since linearly shaped part 62 is axially aligned with torsional spring 52, the inner circumferential part of turbine 6 is positioned more toward the transmission in the axial direction than is the case in the prior art. As a result, the axial dimension of torsion springs 52 can be made larger than is the case in the prior art. Consequently, the performance of torsion springs 52 can be improved by such means as reducing the stiffness thereof. More specifically, the axial position of the portion of torsion springs 52 of damper mechanism 32 that is positioned closest to the transmission in the axial direction is closer to the engine in the axial direction than is the axial position of the portion of turbine 6 that is positioned closest to the engine in the axial direction. Therefore, damper mechanism 32, particularly torsion springs 52, is larger in the axial direction toward the transmission.

It is preferred that the length S of tapered part 63 in the radial direction be from about 10 mm to about 20 mm. If the lengths are shorter than about 10 mm, it will not contribute to increasing the axial dimension of damper mechanism 32. If the lengths are longer than about 20 mm, it will reduce the performance of turbine 6. The values stated here are for a case where the torque converter 1 has a diameter of about 215 mm and the outer radius D of the torus is about 107.5 mm. Stated in a different manner, it is preferred that the ratio (S/D) of the length S of tapered part 63 in the radial direction to the outer radius D of the torus be in the range of about 0.09 to about 0.19.

Additionally, the flow passage area of the outlet of turbine 6 is set to be smaller than the flow passage area of the inlet of turbine 6. Thus, the outlet side of turbine 6 does not need to be closer than necessary to stator 7. As a result, a sufficiently large axial dimension can be secured for stator 7. More specifically, the flow passage area of the outlet of turbine 6 is smaller than the flow passage area of the inlet of turbine 6 by about 2% to about 5% of the flow passage area of the inlet of turbine 6. If the difference is less than 2% then the axial dimension must be shortened, and if difference exceeds 5% then the performance of turbine 6 will decline.

Furthermore, in this embodiment, the flow passage area of the outlet of turbine 6 is set so that, even though it is smaller than the flow passage area of the inlet of turbine 6, it is equal to or larger than the flow passage area of stator 7. The flow passage area of stator 7 mentioned here is the real flow passage area excluding the thickness portion of stator plate 25. As a result, it is difficult for flow losses to occur in the outlet of turbine 6 or in stator 7.

Next the dimensions of each mechanism in torque converter 1 will be explained. As for torque converter 1 itself, the ratio (d/D) of the inner radius d to the outer radius "D" of the torus-shaped main body is in the range of about 0.5 to about 0.57. Thus, since outer radius "D" is larger than inner radius "d" by a sufficient percentage, the length of linearly shaped part 62 (when provided) can be made sufficiently long and torsion springs 52 can be made sufficiently large in the axial direction. Inner radius refers to the radial distance from center O of torque converter 1 to the outer circumferential face of carrier 24 and outer radius "D"refers to the radial distance from center O to the outermost circumferential portion of impeller 5 or turbine 6 (i.e., the outermost circumferential edge of the blades 21 at the outlet of impeller 5 or the inlet of turbine 6).

Furthermore, the axial dimension of turbine 6 is shorter than that of impeller 5. More specifically, impeller 5 and turbine 6 of the torus-shaped torque converter main body are not symmetrical in the axial direction. The ratio (Lt/Lp) of the axial dimension Lp of impeller 5 and the axial dimension Lt of turbine 6 is in the range of about 0.92 to about 0.75. Axial dimension Lt of turbine 6 is the distance from axially intermediate point C1, which is between the outlet of impeller 5 and the inlet of turbine 6, and the portion of the inside of turbine shell 20 that is closest to the engine. Axial dimension Lp of impeller 5 is the axial distance from axial position C1 and the portion of the inside of impeller shell 16 that is closest to the transmission.

As explained previously, the axial dimension of torque converter 1 as a whole can be reduced by shortening the axial dimension of turbine 6 in comparison with that of impeller 5. In particular, the synergistic effect of turbine 6 with linearly shaped part 62 makes it possible to increase coil diameter Ld of torsion springs 52. As a result, the coil diameter Ld of torsion springs 52 increases to a value that is close or equal to axial dimension Lt of turbine 6. More specifically, Ld/Lt is 0.85 or greater and preferably falls in the range of about 0.85 to about 1.0. Thus, the coil diameter Ld of torsion springs 52 (which are constituent to damper mechanism 32 of lockup device 8) can be enlarged, making it easy to improve the performance of torsion springs 52. As a result, it becomes possible to use hydraulic torsion transmission by means of the torus of torque converter 1 only when the vehicle is accelerating from a stop and afterwards to use a mechanical torque transmission mode for which lockup device 8 is engaged.

The original purpose of the present invention is to provide lockup mechanism 8 with a damper performance superior to that of the prior art. However, it can also provide nearly the same or equivalent performance in comparison with the prior art while making it possible to obtain the largest possible coil diameter for the torsion springs within limited space in situations where space in the axial direction is more limited than in conventional situations.

Alternative Embodiment

The present invention can be used not only with torque converters but also with fluid couplings and other hydraulic torque transmitting devices. The present invention is not limited to the specific lockup device structure of the previously described embodiment.

With a hydraulic torque transmitting device in accordance with the present invention, the axial dimension of the damper part can be enlarged because a linearly shaped part is provided on the turbine.

The terms of degree such as "substantially", "about" and "approximately" as used herein mean a reasonable amount of deviation of the modified term such that the end result is not significantly changed, as explained above. These terms should normally be construed as including a deviation of at least ±5% of the modified term if this deviation would not negate the meaning of the term it modifies, or significantly change the end result of the modified term.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A hydraulic torque transmitting device that uses a fluid to transmit torque, said hydraulic torque transmitting device comprising:

a front cover configured to receive an input torque;

a torus including an impeller that forms a fluid working chamber with said front cover, and a turbine disposed opposite to said impeller within said fluid working chamber; and a lockup device disposed between said front cover and said turbine, and said lockup device including a clutch part arranged to mechanically couple said front cover with said turbine, and a damper part arranged to attenuate torsional vibration, said turbine being configured with a linearly shaped part axially aligned with said damper part in the vicinity of an outlet, said linearly shaped part including a tapered surface facing toward said damper part, said tapered surface being formed by a turbine shell of said turbine, and a ratio (S/D) of a length S of said tapered surface in the radial direction to an outer radius D of said torus being in a range of about 0.09 to about 0.19.

2. A hydraulic torque transmitting device that uses a fluid to transmit torque, said hydraulic torque transmitting device comprising:

a front cover configured to receive an input torque;

a torus including an impeller that forms a fluid working chamber with said front cover, and a turbine disposed opposite to said impeller within said fluid working chamber; and a lockup device disposed between said front cover and said turbine, and said lockup device including a clutch part arranged to mechanically couple said front cover with said turbine, and a damper part arranged to attenuate torsional vibration, said turbine being configured with a linearly shaped part that is axially aligned with said damper part in the vicinity of an outlet, said linearly shaped part including a tapered surface facing toward said damper part, and a ratio (S/D) of a length S of said tapered surface in the radial direction to an outer radius D of said torus being in a range of about 0.09 to about 0.19.

3. A hydraulic torque transmitting device that uses a fluid to transmit torque, said hydraulic torque transmitting device comprising:

a front cover configured to receive an input torque;

a torus including an impeller that forms a fluid working chamber with said front cover, and a turbine disposed opposite to said impeller within said fluid working chamber; and a lockup device disposed between said front cover and said turbine, and said lockup device including a clutch part arranged to mechanically couple said front cover with said turbine, and a damper part arranged to attenuate torsional vibration, said turbine being configured with a linearly shaped part that is axially aligned with said damper part in the vicinity of an outlet, a ratio (S/D) of a length S of a tapered surface of said linearly shaped part in the radial direction to an outer radius D of said torus is in a range of about 0.09 to about 0.19.

4. A hydraulic torque transmitting device as set forth in claim 3, wherein said tapered surfaced is inclined relative to a plane perpendicular to a rotational axis of said hydraulic torque transmitting device from about 15 degrees to about 25 degrees.

5. A hydraulic torque transmitting device as set forth in claim 4, wherein said tapered surfaced is inclined relative to a plane perpendicular to a rotational axis of said hydraulic torque transmitting device about 20 degrees.

6. A hydraulic torque transmitting device as set forth in claim 3, wherein a ratio (d/D) of a length of an inner radius d of said torus to said outer radius D of said torus is in a range of about 0.5 to about 0.57.

7. A hydraulic torque transmitting device as set forth in claim wherein a ratio (Lt/Lp) of a width Lt of said turbine in a direction parallel to a rotational axis of said hydraulic torque transmitting device to a width Lp of said impeller in a direction parallel to said rotational axis of said hydraulic torque transmitting device is between about 0.92 to about 0.75.

8. A hydraulic torque transmitting device as set forthin claim 3, wherein a ratio (Ld/Lt) of a coil diameter Ld of a coil spring of said damper part to a width Lt of said turbine in a direction parallel to a rotational axis of said hydraulic torque transmitting device is between about 0.85 to about 1.0.

9. A hydraulic torque transmitting device as set forth in claim 3, wherein said torus further comprises a stator made of cast resin or cast aluminum alloy.

10. A hydraulic torque transmitting device as set forth in claim 3, wherein said clutch part comprises a clutch plate and an inner cylindrical member, said clutch plate is disposed radially outward from said inner cylindrical member.

11. A hydraulic torque transmitting device as set forth in claim 10, wherein said clutch plate is configured to be non-rotatably and axially movably attached to said inner cylindrical member.

12. A hydraulic torque transmitting device as set forth in claim 11, wherein said clutch plate and said inner cylindrical members have interlocking teeth.

13. A hydraulic torque transmitting device as set forth in claim 12, wherein said inner cylindrical member has a flange that said damper part to said clutch part.

14. A hydraulic torque transmitting device that uses a fluid to transmit torque, said hydraulic torque transmitting device comprising:

a front cover configured to receive an input torque;

a torus including an impeller that forms a fluid working chamber with said front cover, and a turbine disposed opposite to said impeller within said fluid working chamber; and a lockup device disposed between said front cover and said turbine, and said lockup device including a clutch part arranged to mechanically couple said front cover with said turbine, and a damper part arranged to attenuate torsional vibration, said turbine being configured with a linearly shaped part that is axially aligned with said damper part in the vicinity of an outlet, and a flow passage area of an outlet of said turbine being smaller than a flow passage area of an inlet of said turbine.

15. A hydraulic torque transmitting device as recited in claim 14, wherein the flow passage area of the outlet of said turbine is larger than a flow passage area of said stator.

16. A hydraulic torque transmitting device as recited in claim 14, wherein the flow passage area of the outlet of said turbine is smaller than the flow passage area of the inlet of said turbine by 2 to 5% of the flow passage area of the inlet of said turbine.

17. A hydraulic torque transmitting device as recited in claim 16, wherein the flow passage area of the outlet of said turbine is larger than a flow passage area of said stator.

* * * * *